United States Patent Office 3,262,709
Patented July 26, 1966

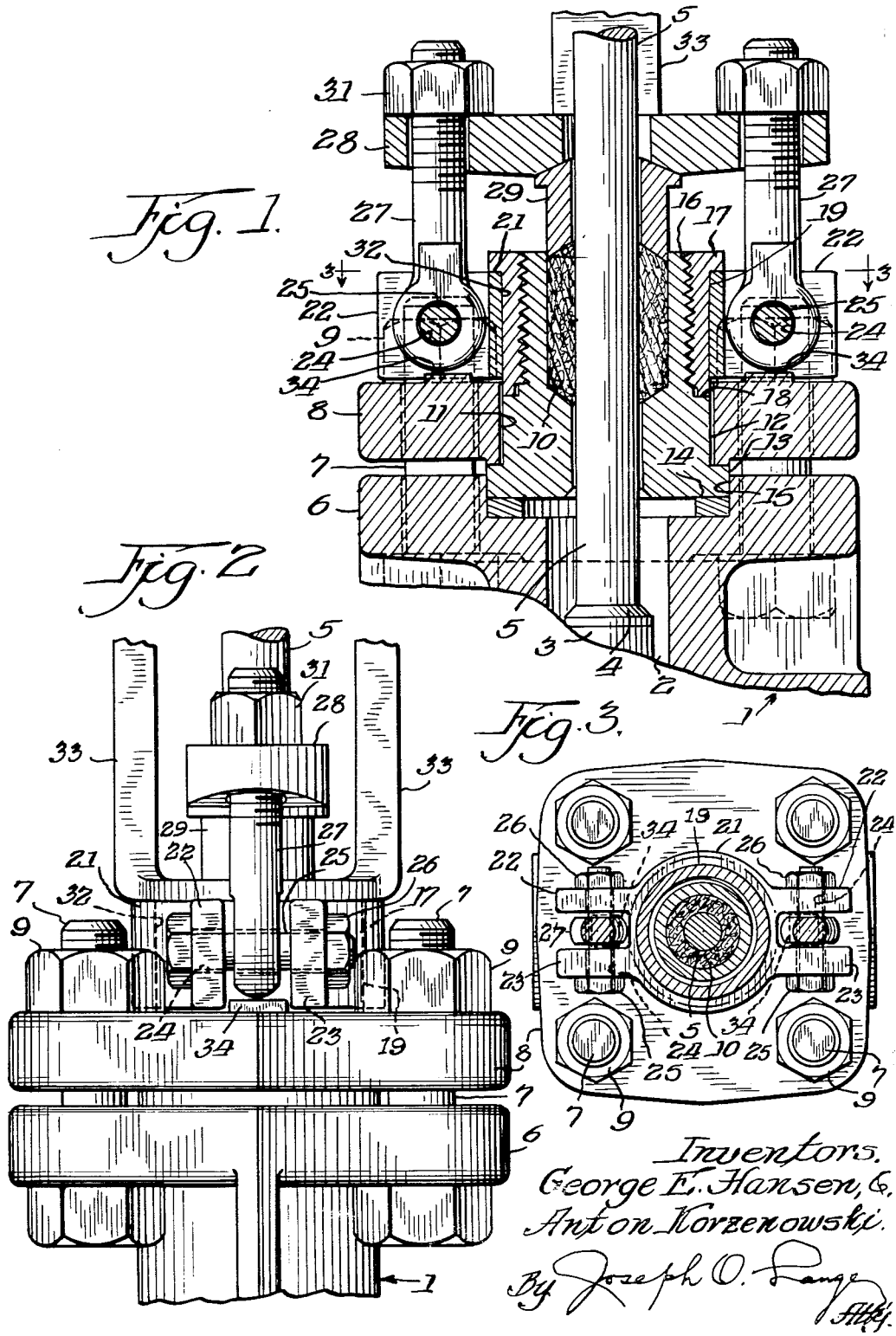

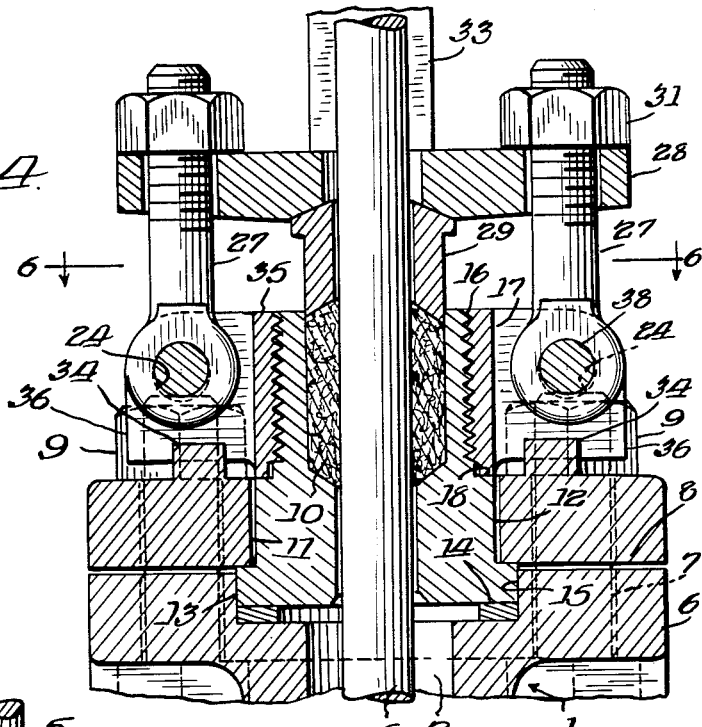
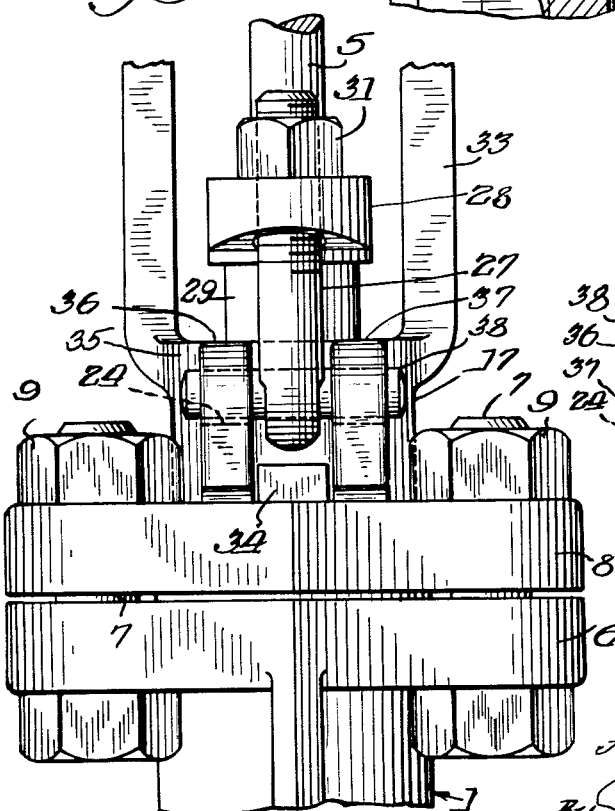
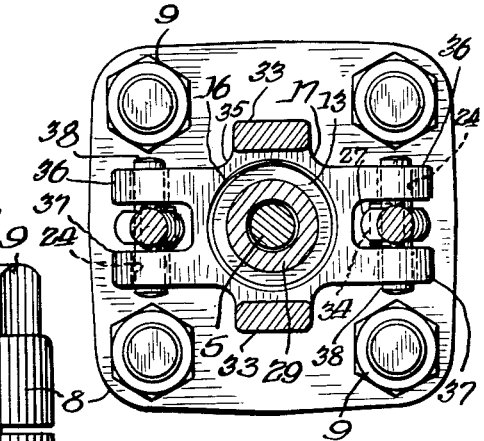

3,262,709
GLAND EYE-BOLT COLLAR ARRANGEMENT FOR STUFFING BOX CONSTRUCTION
George E. Hansen, Elmwood Park, and Anton Korzenowski, Brookfield, Ill., assignors to Crane Co., Chicago, Ill., a corporation of Illinois
Filed July 3, 1963, Ser. No. 292,636
3 Claims. (Cl. 277—105)

This invention relates generally to a packing container construction for the stems of valves, shafts of pumps, and the like. More particularly, it is concerned with a novel structure using a gland eye-bolt construction cooperating with the valve bonnet.

This stuffing box construction is obviously suitable not only for the items referred to, but may also be used with other types of pressure vessels, such as cylinders, in which a reciprocating or a rotating or a combined reciprocating-rotating shaft is mounted in a leakproof bearing.

In order to have a better understanding of the advantages of this contribution, it should be realized that when stuffing boxes are employed in connection with either rotating or reciprocating shafts, it is important to align the stuffing box accurately with relation to shafts or valve stems.

Therefore, it is an important object of this invention to provide a construction possessing convenient flexibility in providing accurate alignment between affected valve parts.

A further object is to provide a valve construction in which the parts therefor are so designed and arranged as to permit a wider selection of material for such parts in coping with a wide variety of service conditions encountered in the field and also recognizing manufacturing problems.

Another important object of this invention is to provide for a pivoted gland eye-bolt mounting in which the said mounting is removably attached to the valve stuffing box member.

A further object is to provide a gland eye-bolt mounting in which the valve yoke is preferably an integral part thereof.

An important object of this invention is to provide a gland bolt mounting in which the valve yoke serves as the means of attachment for the said mounting to the valve stuffing box.

Another object is to provide for a gland bolt mounting which is separable from the valve yoke and is attached thereto by the same bolting means functioning to retain the gland eye-bolts to the said mounting.

Another important object is to provide a revolvable bonnet on the stuffing box in which fixed projecting lugs on the bonnet cooperate with the gland bolt mounting to inhibit relative rotation predeterminately between said bonnet and said mounting.

Another object is to provide for a gland bolt mounting in which upon the insertion of the pivotable eye-bolt used in this invention and completing said assembly, the said eye-bolt is incapable of being bodily displaced while still possessing the ability to be pivotally moved to either side of the yoke to permit repacking of the stuffing box.

Another object is to provide for a gland bolt retaining means in which the said retainer may be either integral with the yoke or else may be conveniently detached from the yoke and in which there is such cooperation between the retainer and the bonnet as to permit accurate location of the gland eye-bolt retaining means with respect to the central axis of the valve.

Other objects and advantages will become more readily apparent upon proceeding with the following description read in light of the accompanying drawings, in which:

FIG. 1 is a fragmentary sectional assembly view of a preferred embodiment of our invention;
FIG. 2 is an end exterior view at 90° to the view shown in FIG. 1;
FIG. 3 is a reduced fragmentary plan sectional view taken on the line 3—3 of FIG. 1;
FIG. 4 is a fragmentary sectional assembly view of a modified form of our invention;
FIG. 5 is an end exterior view at 90° to the view shown in FIG. 4; and
FIG. 6 is a reduced fragmentary plan sectional view taken on the line 6—6 of FIG. 4.

Similar reference numerals refer to similar parts throughout the several views.

Referring now to FIG. 1, in which fragmentarily a valve casing 1 is shown, having the valve chamber 2 within which a reciprocally movable closure member 3 attached as at 4 to a stem 5 is mounted for the movement stated. At the upper portion of the said casing, a conventional integral bonnet flange 6 is provided retained by means of the bolts 7 to a bonnet or cover 8. The casing bonnet flange 6 and the bonnet member 8 are held together in fluid sealing relation by means of the bonnet nuts 9.

The bonnet member 8 is centrally apertured as at 11 to receive the stuffing box member 12 relatively loosely, the latter member being annularly flanged as at 13 to bear against the annular gasket 14 retained within the recess 15 of the casing bonnet flange 6 as shown whereby to form a fluid sealing connection between the stuffing box 12 and the said valve casing. Stuffing box packing 10 is provided as indicated.

At its upper or outer portion, the stuffing box 12 is externally threaded as at 16 to receive the internally threaded yoke 17, the latter member at its lower hub preferably shouldering against the annular shoulder 18 on the stuffing box 12 as indicated.

As shown more clearly in the plan sectional view of FIG. 3 around the yoke shank 19, an eye-bolt retainer member 21 is of bifurcated form with the lug-like extensions 22 and 23 oppositely disposed as shown in FIG. 3. The said lugs 22 and 23 are apertured as at 24 to receive the transversely extending bolts 25 retained thereto by means of the nuts 26 around which the eye bolts 27 are mounted and at their opposite threaded ends engaging the gland flange 28 cooperating with the gland 29 and the gland bolt nuts 31 to compress the packing 10. The gland bolt retainer member 21 on its central apertured portion as at 32 encompasses the lower depending shank portion 19 of the yoke 17, the latter member having the oppositely disposed yoke arms 33 as shown more clearly in FIG. 2.

In order to provide for the assembly referred to between the gland bolt retainer means 21 and the engagement by the threaded yoke member 17, the said retainer means is assembled by initially slipping the said retainer over the yoke shank 19, and assemble the bonnet 8 around the shank portion of the stuffing box 12. Then, the threaded stuffing box is screwed into the yoke threads 16 thereby to hold the retainer 21 between the upper surface of the bonnet 8 and the shoulder portion of the yoke 17. In making said assembly the bonnet lugs 34 are positioned between the extending apertured lugs 23 and 24 as shown so as to fixedly establish the position of the retainer 21 and the yoke arms 33 relative to the bonnet 8.

Said assembly is then ready for attachment to the valve casing which is accomplished by drawing up the nuts 9 on the bonnet bolts 7 to firmly clamp the flanged portion 13 of the stuffing box 12 against the gasket 14 in the casing recess 15 as shown.

Immediately before the latter attachment is effected, the gland bolts 27 are assembled upon the bolts 24 held in place as shown, although drive pins or similar means may be substituted satisfactorily.

This invention is also capable of embodiment in other forms and in this connection, as an example, attention is directed to FIGS. 4 to 6 inclusive, in which in all respects the general valve construction is similar to that previously described in connection with FIGS. 1 to 3 inclusive. However, in this construction, the gland bolt retainer is made integral as shown at 35 with the yoke 17 and therefore the yoke arms 33 serve as integral connections with the said gland bolt retainer means, the latter means together with the yoke 17 being threadedly attached as at 16 to the stuffing box 12. This construction thus serves as the means by which the combined gland bolt retainer and yoke are attached to the bonnet 8 in the manner previously described. In this construction, it will therefore be apparent that it is unnecessary to provide a separate gland bolt member, since the yoke 17 integral therewith is provided with the oppositely disposed lugs 36 and 37 apertured to receive the respective drive pins 38 for the eye-bolts 27. There is preferably a drive fit connection between the said bolts and the pins to keep the pins from dropping out. By means of the bonnet lugs 34 as previously referred to, the yoke with its gland bolt retainer means can be accurately positioned relative to the bonnet and held against rotation. In both constructions, because of the fact that eye-bolts are employed on a mounting in which the respective lugs 22 and 23 as well as 36 and 37 are spaced apart or arranged in a bifurcated manner, the gland bolts during the course of repacking the stuffing box 10 can easily be pivoted out of the way upon removal of the gland nuts 31 from their engagement with the gland flange 28.

In summary, it will be apparent that a convenient and durable gland bolt retainer and yoke construction has been devised in which identical stuffing box structures may be used to facilitate interchangeability and thus standardize on valve parts.

While only a pair of preferred embodiments have been shown and described, it will be clear that this is for purpose of illustration only, and therefore the scope of the invention should be measured by the appended claims interpreted in light of the prior art.

We claim:

1. In a stuffing box construction for a valve or the like, the combination of a valve casing and a bonnet therefor having a substantially central apertured portion, a stuffing box mounted within said apertured portion, a stem projecting through said stuffing box, a gland and pivotally mounted gland eye-bolts for said stuffing box, retainer means for said eye-bolts, a valve yoke threadedly mounted on said stuffing box for journalling said stem having oppositely disposed yoke arms on each side of said stuffing box, said yoke having a lower shank portion for carrying said retainer means, the retainer means being of bifurcated form when viewed in plan and having a pair of oppositely disposed apertured lug like extensions in spaced-apart relation, the said gland eye-bolts being transversely received in apertures within the spaced-apart portions of said apertured lug-like extensions to permit pivotal movement of said eye-bolts, said bonnet having lugs on an upper face thereof normally positioned and closely fitted between said spaced apart apertured lug-like extensions whereby to position and to prevent relative rotation between said bonnet and said yoke and retainer means.

2. The subject matter of claim 1, the said retainer means enclosing said lower shank portion of said yoke and being held against substantial endwise movement between an annular surface forming a shoulder on a lower part of said yoke and the upper face of said bonnet having said lugs.

3. The subject matter of claim 1, the said yoke and retainer means being removably attached to said stuffing box, the said bonnet being clamped between said retainer means and an annular flange on the lower portion of said stuffing box.

References Cited by the Examiner
UNITED STATES PATENTS 2,428,963 10/1947 Fennema et al. _____ 220—46
3,162,453 12/1964 Magos et al. _____ 277—105

SAMUEL ROTHBERG, *Primary Examiner.*